UNITED STATES PATENT OFFICE.

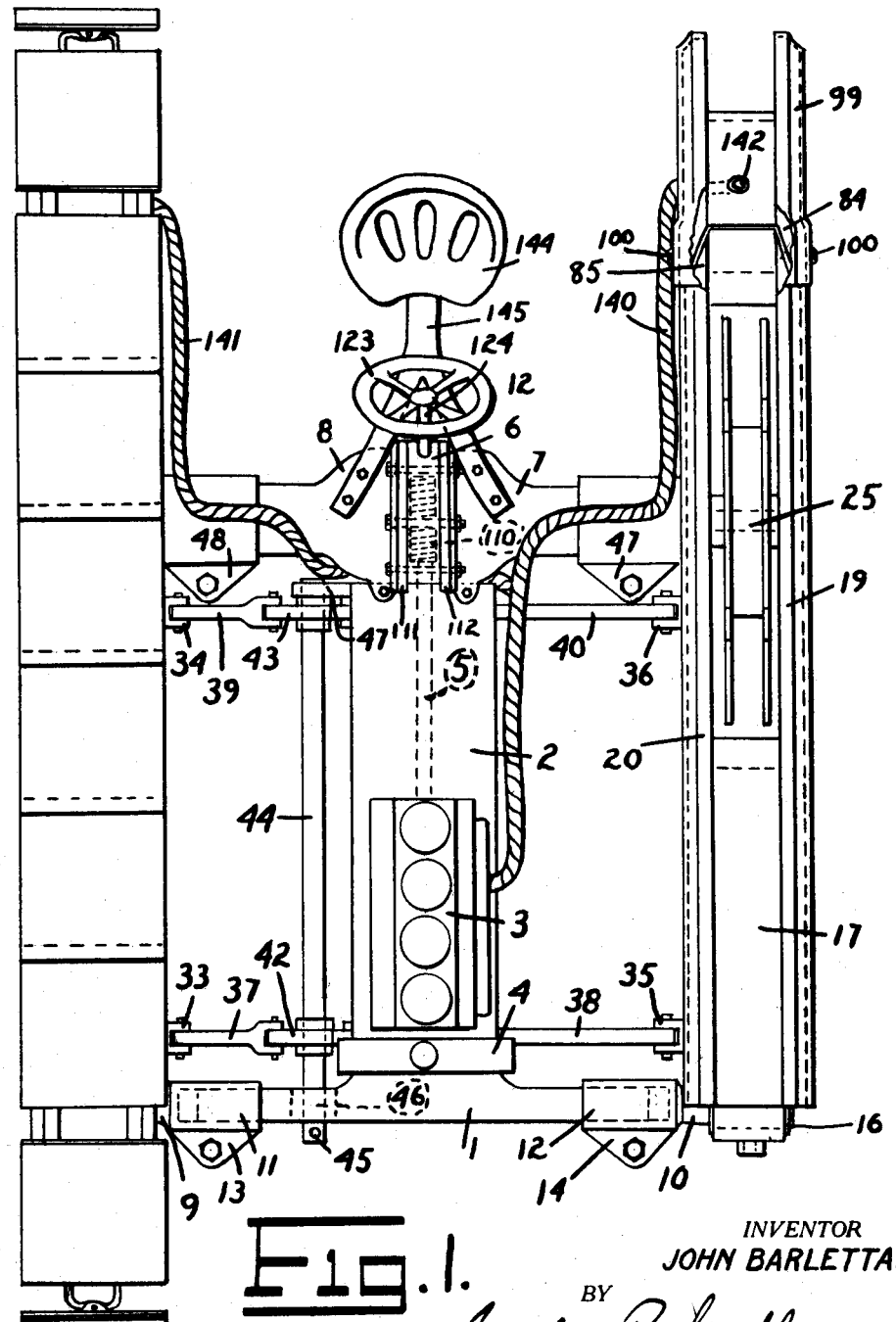

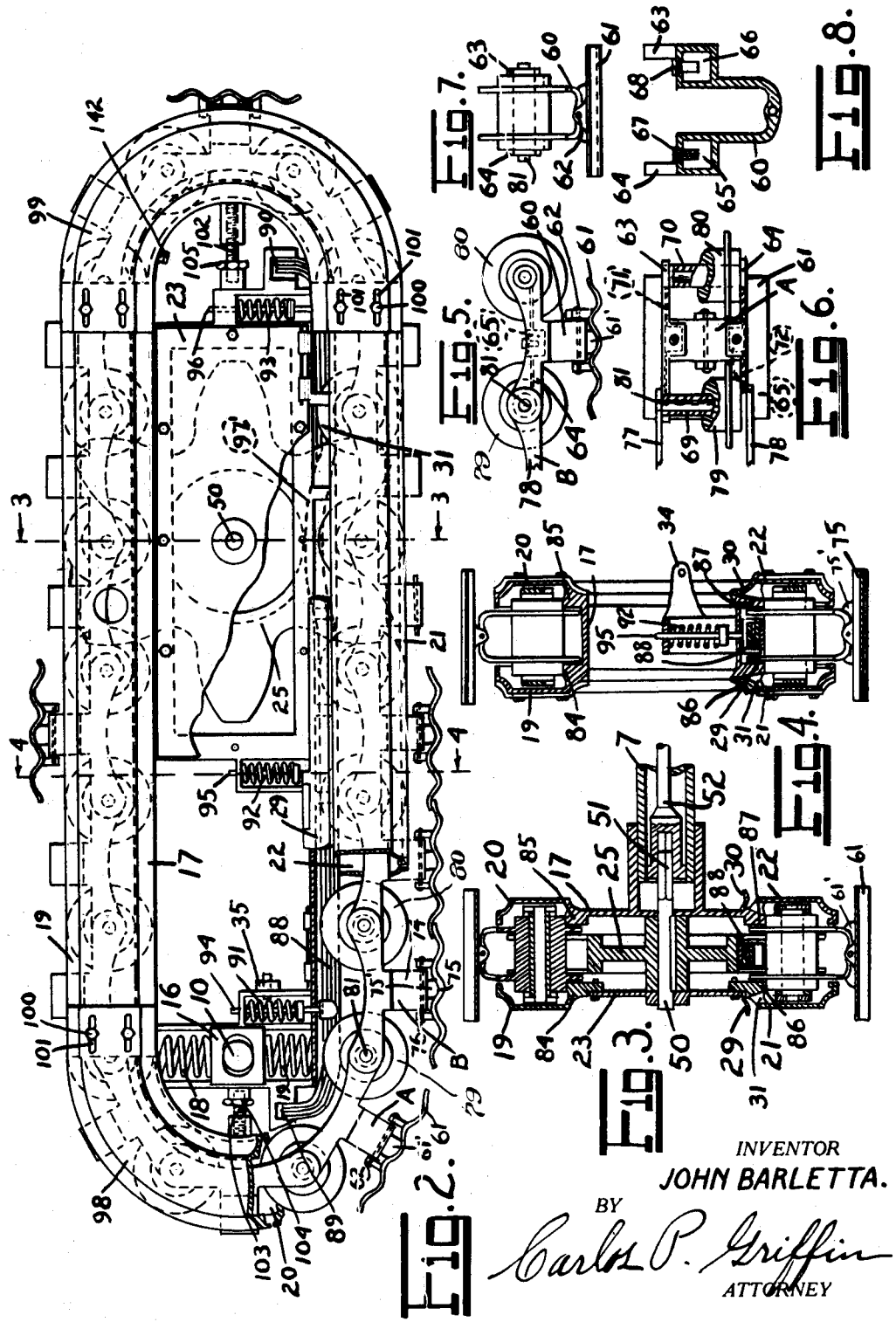

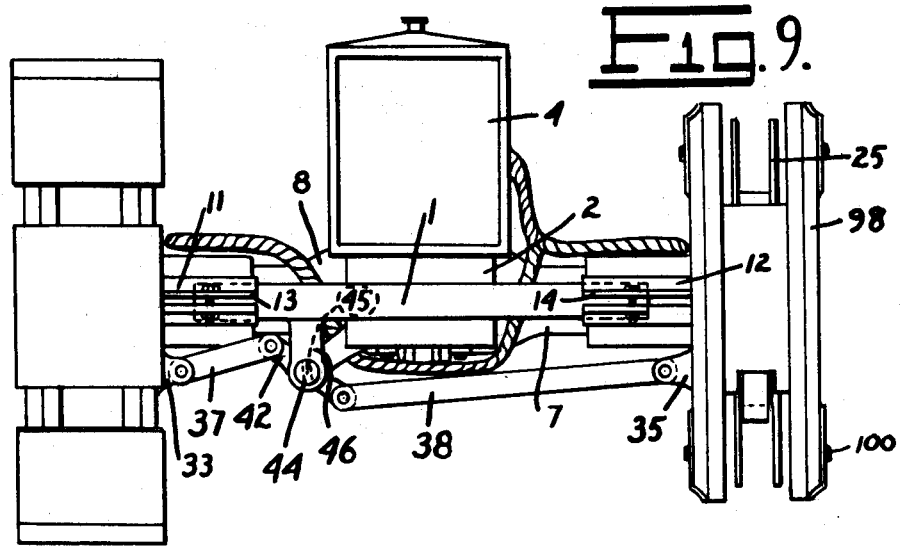
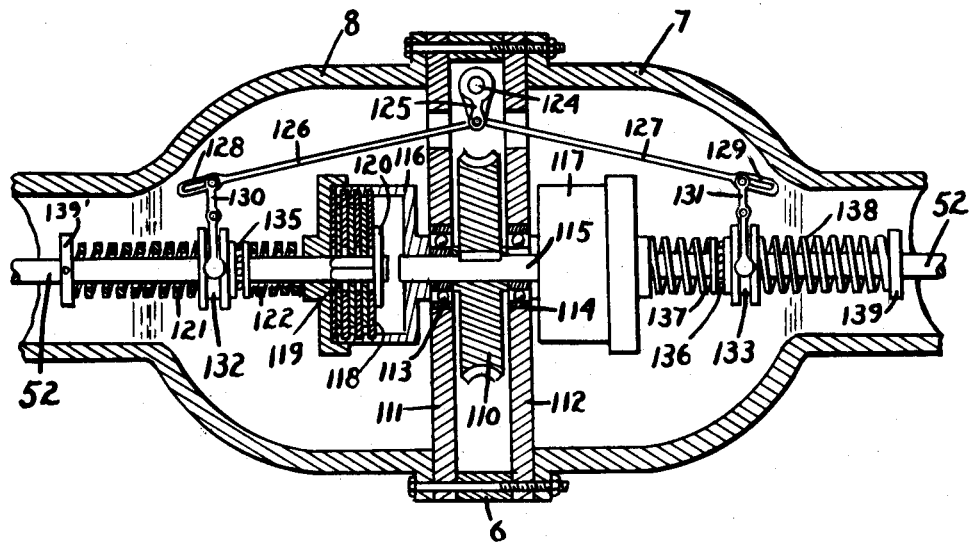

JOHN BARLETTA, OF SAN FRANCISCO, CALIFORNIA.

TRACTOR.

1,385,108.  Specification of Letters Patent.  Patented July 19, 1921.

Application filed July 8, 1919. Serial No. 309,505.

*To all whom it may concern:*

Be it known that I, JOHN BARLETTA, citizen of the United States, residing at San Francisco, in the county of San Francisco, State of California, have invented a new and useful Tractor, of which the following is a specification in such full and clear terms as will enable those skilled in the art to construct and use the same.

This invention relates to an endless tread tractor of the type in which one tread is released or partly released when the machine is being turned, and one of the objects of this invention is to produce a set of links for the endless tread which will be provided with self contained oiling mechanism, and with connections between the links of such a nature as to prevent direct wear upon the individual links. All of the wear comes upon the pins connecting the links.

Another object of the invention is to provide a spring for carrying the load of the tractor, which will be so constructed as to cause the tractor tread to be depressed into low places in the ground, over which the machine may pass, thereby improving the hold of the machine upon the ground.

Another object of the invention is to provide auxiliary springs for depressing the spring just mentioned, whereby the grouser plates will be forced away from the main supporting frame.

Another object of the invention is to provide an inclosed tubular frame, within which the movable parts of the chain pass, which frame is for the purpose of preventing the accumulation of dirt and mud on the rollers and sprocket wheel.

Another object of the invention is to provide a tractor, the treads of which may be laterally extended or narrowed to admit the use of the machine in plowing rows of plants, wider or narrower as may be desired.

Another object of the invention is to so locate the exhaust that the pressure of the exhaust gases will assist in keeping the rollers and links of the endless treads free from sand, gravel or dirt that may be dropped into the tubular frame in which the chain moves upon the grouser plates.

Another object of the invention is to provide a steering mechanism of such a nature as to enable the clutches to be very nicely adjusted and very easily operated.

Another object of the invention is to provide an adjustment for the tubular frame at each end thereof.

Other objects of the invention will appear as the description proceeds.

An embodiment of the invention is shown in the drawing in which the same reference numeral is applied to the same portion throughout, but I am aware that there may be modifications thereof.

Figure 1 is a plan view of the complete machine with one of the tractor treads and one of the adjusting tracks removed for purposes of illustration, Fig. 2 is a side elevation of one of the endless treads and the frame supporting it, Fig. 3 is a transverse sectional view of one of the endless treads carrying frames, the plane of section being the line 3—3, Fig. 2, Fig. 4 is a vertical sectional view of one of the endless tread carrying frames on the line 4—4, Fig. 2, both sections being taken looking in the direction of the arrow, Fig. 5 is a side elevation of one of the tractor tread links and two of the rollers, the grouser plate also being shown, Fig. 6 is a plan view of one of the tractor tread links and the attached grouser plate, Fig. 7 is an end view of one of the tractor tread links and the attached grouser plate, Fig. 8 is a transverse sectional view of one of the tractor tread links carrying the oil receptacles, Fig. 9 is a front elevation of the tractor with one of the endless treads removed therefrom, Fig. 10 is a vertical sectional view of the differential casing showing the operation of the steering mechanism.

The tractor has a front axle 1 and main frame 2 which forms the supporting base for an engine 3 and radiator 4 and since the precise means of driving the tractor from the engine forms no part of the present invention, no gearing for connecting the engine to the main drive shaft 5 is illustrated.

The main frame 2 has an extension 6 to which the differential housings 7 and 8 are bolted.

At the front of the machine, there are two stub axles 9 and 10 each provided with a sleeve as indicated at 11 and 12, which sleeve is supplied with the clamps 13 and 14 for securing said stub axles in any given adjustment on the opposite ends of the axle 1. The stub axles 9, 10 each extend into a box as illustrated at 16, one box for each endless tread, which boxes are held in a central location with respect to the endless tread of the tread or side frame 17 by means of the two spiral springs 18 and 19. Said boxes are free to slide vertically under the restraint of said spiral springs one above and one below each box.

The tread or side frame 17 is a single solid casting provided with housings 19, 20 at the top to inclose the upper run of the endless tread, and with the housings 21, 22 at the lower portions.

A plate 23 is secured on the outside of each main frame for the purpose of permitting access to the interior of said frame for the insertion of the key in the key way of the sprocket wheel 25, one for each tread. Along the side of the frame just above the lower run of the links, are two long narrow doors 29, 30 which are hinged to the frame to allow the operator to oil the links through the openings such as 31 in the side housing.

The side frames have lugs 33, 34, 35 and 36 connected therewith, which lugs are in turn, connected to the links 37, 38, 39 and 40 respectively. These links are connected to the arms 42 and 43 on the opposite sides of the shaft 44 in pairs. Said shaft is rotated by means of a bar passing through the hole 45 to either widen or narrow the tread of the tractor, as may be desired. The shaft 44 is supported in two bearings 46, 47.

The position of the treads with respect to the front axle is made rigid by means of the clamps 13 and 14, while the position of the treads with respect to the differential housing is made rigid with the clamps 47, 48 secured to a projecting sleeve on the frame 17.

The sprocket wheels 25 each have a driving shaft 50 which has a squared portion 51 slidable in a squared socket in the main drive shaft 52. There are two of the latter shafts journaled in suitable bearings in the ends of the differential housing and also having suitable bearings within the clutch members, as will be later explained.

From the foregoing construction, it will be seen that the treads of the tractor may be widened or brought up closer together by such an amount as the adjustment of the clamps 13, 14 will permit.

The tractor tread comprises a plurality of links of the types indicated at A and B. The links A are cast as a unit and have a depending U shaped portion 60 to which the grouser plate 61 is connected by means of the bolt 62. The link has two side members 63, 64 at the centers of which are enlargements forming chambers 65, 66 to receive the oil and the oil is placed in said chambers through two tubes 67, 68, which will permit only a certain amount of oil to pass into the chamber and which chamber will prevent the escape of oil therefrom without the necessity of a closure for said tube. In order to prevent wear upon the link members themselves, the side members 63, 64 have steel bushings 69, 70 forced thereinto so as to be rigidly connected therewith, and said bushings have openings to permit the oil to pass through the passage ways 71, 72 and lubricate the interior and exterior of said bushings 69, 70.

The links B have a U shaped projection 74 to which the grouser 75 is connected by means of the bolt 76. These links have plain side members 77, 78, which side members are intended to fit on the outside of the side members 63, 64 of the links A.

When the links A are being assembled, the bushings 69, 70 are passed through the flanged rollers 79, 80 and when the links A, B are being connected, the links B are assembled with their side members on the outside of the ends of the side members 63, 64 of the links A. Pins 81 are then passed through the bushings 69, 70, said pins being loose in the bushings but rigidly connected with the side members 77—78, whereby all of the wear of movement comes upon the pins and bushings and none of the wear directly upon the links themselves.

When the tractor tread is assembled, the rollers bear upon the tracks 84 to 87 inclusive, the flanges of the rollers extending between said tracks, and the central part of the rollers bears upon a long spring made up of several series of leaves as indicated at 88. The spring 88 engages the frame somewhat loosely at its ends as indicated at 89 and 90. Spiral springs 91, 92, 93 bear upon rods 94, 95, and 96, which rods in turn bear upon the spring leaves 88 and tend to force said spring downwardly should the endless tread pass over a depression in the general level of the ground, thereby increasing its tractive area of contact on the ground. The spring leaves 88 are raised as indicated at 97 to enable the rollers 79, 80 to be turned in the proper direction when engaged by the teeth of the sprocket wheel 25.

At the ends of the side frame, there are two semicircular frames 98, 99. These frames are adjustable longitudinally with respect to the side frame 17 by means of a series of bolts 100 passing through slots 101 into the adjustable frames and extend the side frame. There are eight of these bolts for each of the frames 98, 99, four being on one side and four being on the opposite side, as illustrated at the right hand in Fig. 2.

The adjustment of the frames 98, 99 is accomplished through the medium of the adjusting screw 102 at the rear, and the adjusting screw 103 at the front end of the tread. Said screws have hexagonal heads as indicated at 104 and 105 for turning them.

The drive shaft 5 is connected through its worm with a worm wheel 110 within the housing 6. This housing has two plates 111 and 112 secured thereto which plates serve to hold bearings 113 and 114 for a short shaft 115. The shaft 115 has clutch casings 116 and 117 on its ends, said casings carrying a plurality of disks 118 which may be engaged with a plurality of disks 119, revoluble with the shafts 52. Each of said shafts has a collar 120 to draw the clutch members together under the pressure of the springs 121, 122.

Under normal conditions, the clutch members 116, 117 will rotate both of the shafts 52 at the same speed, and in the same direction, but if it is desired to turn the machine in one direction or the other, it may be accomplished by rotating the steering wheel 123. Said steering wheel is carried by the steering post 124.

This steering post extends into the housing 6 and has an arm 125 to which is pivoted two links 126, 127. The links 126, 127 have slotted ends as indicated at 128, 129, which slotted ends engage one end of levers 130, 131. The levers 130, 131 are pivotally mounted in the housings 7 and 8 respectively and engage grooved clutches 132, 133 on the shafts 52.

The springs 121 bear upon one side of the clutch 132, while a thrust bearing 135 bears upon the other side of the clutch 132, and the spring 122 bears upon the casing 116 and thrust bearing 135. On the other shaft 52, there is a ball bearing 136 which bears upon the collar 133, and a spring 137 bears upon the collar 136. A spring 138 bears on a fixed clutch 139 and upon the slidable clutch 133.

In operation, the plate in each bearing 135 and 136 is secured to its corresponding shaft 52 with the result that when the steering wheel is turned in such a direction as to push the clutches 132 and 133 toward the clutch casings, that the clutches therein will be released, thereby discontinuing the driving of one side of the endless tread.

The shafts 52 have collars as indicated at 139, 139' fixed thereon.

In the normal operation of the apparatus, the two springs bear upon each of the collars 139, 139' to cause the collar disks 118, 119 to be engaged with sufficient force to drive the apparatus; but when a turn is to be made, one of the clutches 132 or 133 is pushed toward the clutch casings 116 or 117 with the result that one side or the other of the tractor tread is released or slowed down to such an extent as to cause the machine to turn in one direction or the other. During the time either one of the clutches is released, the ball bearings 135, 136 take up the thrust from the collars 132, 133 and springs 122, 137, the object of assembling the clutches 131, 132 between the two springs is to enable the operator to have a better control over the clutch operation than would be the case with but a single spring.

It is to be noted that the side frame 17 and its housing together with the frames 98, 99, have an inclosed channel within which the parts of the chain subjected to wear can move without danger of accumulating great amounts of mud and dust thereon, as is the case where the chain is open. In order to assist further in preventing the mud and dust from dropping into this channel as the chain rises, the flexible exhaust pipes 140, 141 are connected to the casings 99 by means of nipples 142. By discharging the exhaust into the side frame a certain amount of dust and dirt that would otherwise tend to collect therein is blown away from said frame, since the tread frame is closed on all sides except where the tread links are connected to the grouser plates.

The mechanism for operating the tractor at different speeds and for discontinuing the operation of the engine without stopping the tractor is not illustrated herein, since it forms no part of the present invention; but may be in any desired form.

In order to provide for the convenience of the operator, a seat 144 is secured upon a spring standard 145 which is in the rear of the steering wheel, said standard being connected to the housings 7 and 8.

In order to prevent the grouser plates 61, 75 from rattling, rubber blocks 61', 75' are installed under the links.

In order to assemble the chain, a hole H is made in the side frame.

What I claim is as follows, but various modifications may be made in the construction shown in the drawings and above particularly described form, within the purview of my invention.

1. An endless tread tractor comprising a main frame, front and rear axles carried by said frame, laterally adjustable side frames carried by the axles, an endless tread carried by each of the laterally adjustable frames, and means to rotate the rear axle to drive the endless treads.

2. An endless tread tractor comprising a main frame having front and rear axles, adjustable side frames supported by said front and rear axles, means to move said adjustable frames toward or away from each other, means to secure said frames in a fixed position on the axles, an endless tread carried by each of said frames, and means to drive each of said treads to move the tractor.

3. An endless tread tractor comprising a main frame, side frames having endless channels connected therewith, said channels having endless tracks formed therein, a chain inclosed by each channel, flanged rollers carried by the chain and bearing upon the tracks, lugs connected with the chains, grouser plates carried by the chain lugs to afford a ground bearing, and means to drive the chains to move the tractor.

4. An enless tread tractor comprising a main frame, side frames carried thereby, an endless tread extending around each side frame, rollers carried by the endless treads and bearing upon said frames, grouser plates carried by the endless treads for bearing upon the ground, and a spring bar adapted to force the endless treads downwardly when passing over uneven ground.

5. An endless tread tractor comprising a main frame, front and rear axles, side frames carried thereby, an endless tread surrounding each frame and carrying a plurality of rollers inclosed by said frames and a spring having a plurality of leaves extending longitudinally of each side frame adapted to be engaged by the tread rollers to force the lower run of the endless treads downwardly when passing over uneven ground.

6. An endless tread tractor comprising a main frame, front and rear axles carried thereby, side frames carried by the axles, an endless tread surrounding each frame and carrying a plurality of rollers inclosed by said frames, means to drive the endless treads and a longitudinally extending spring upon which the lower run of each endless tread bears at points in front and at the rear of the tread driving mechanism to force the lower run of the endless tread downwardly when passing over uneven ground and means at the ends of said spring to prevent it from moving longitudinally.

7. A link for endless tread tractors comprising a link having an oil chamber and passage ways extending therefrom to its bearings, and an oil supply tube extending into said chamber a considerable distance, whereby upon the inversion of the link, the oil cannot flow unto the tube again.

8. A link for endless tread tractors comprising a pair of side members rigidly connected by a bearing member, the link having two oil chambers formed therein, with passage ways extending to the bearings thereof, and oil supply tubes extending into each oil chamber a considerable distance whereby upon the inversion of the link, the oil cannot escape therefrom.

In testimony whereof I have hereunto set my hand this 20th day of June A. D. 1919.

JOHN BARLETTA.